Jan. 1, 1935.  F. L. MORSE  1,986,008
POWER DRIVE SYSTEM
Filed May 21, 1932   3 Sheets-Sheet 2
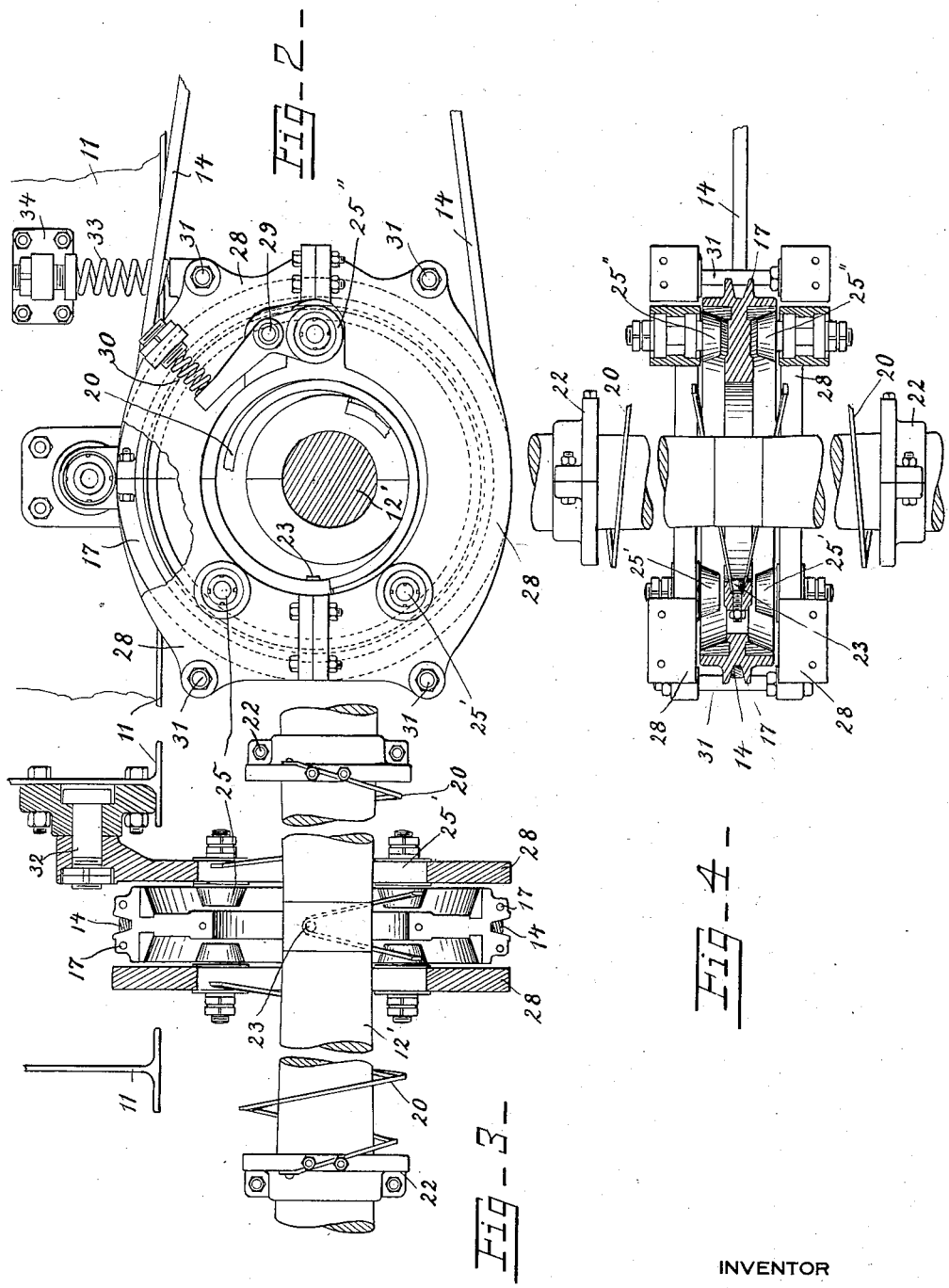
INVENTOR
FRANK L MORSE Jan. 1, 1935.  F. L. MORSE  1,986,008
POWER DRIVE SYSTEM
Filed May 21, 1932   3 Sheets-Sheet 3

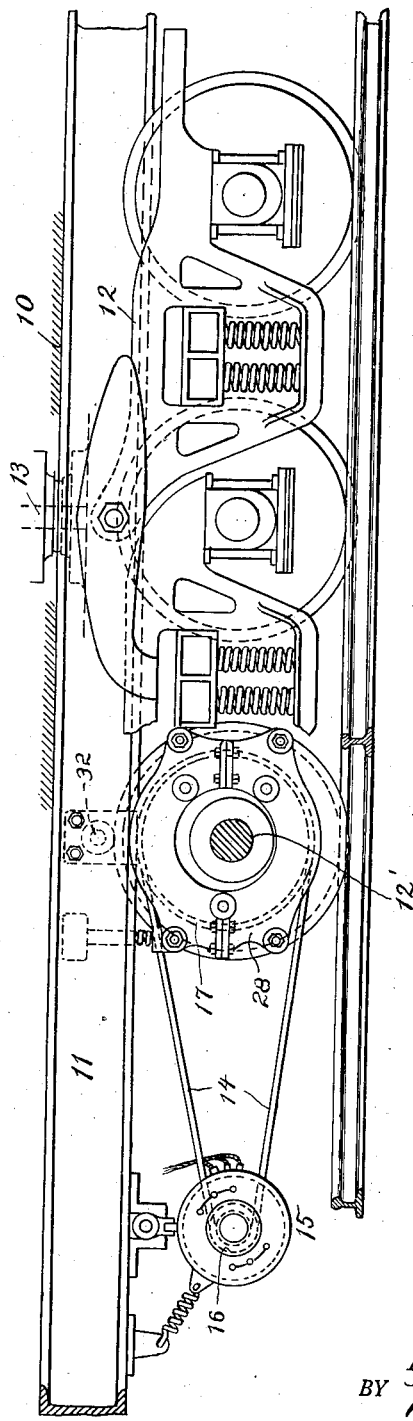

INVENTOR.
FRANK L. MORSE
BY
ATTORNEY

Patented Jan. 1, 1935

1,986,008

UNITED STATES PATENT OFFICE 1,986,008

POWER DRIVE SYSTEM

Frank L. Morse, Ithaca, N. Y.

Application May 21, 1932, Serial No. 612,714

12 Claims. (Cl. 105—102)

This invention relates to means for transmitting mechanical power from an axle or drive shaft having a large amount of longitudinal motion, lateral motion, and angular displacement, to a relatively fixed driven shaft by means of a belt or gearing transmission system whose elements are held in strict alignment. It is particularly applicable to electric generators for railway cars, which are ordinarily driven by means of a belt from a pulley mounted on an axle of the car truck, while the generator is mounted on the underside of the car body. The axle upon which the pulley is mounted may have an angular movement of over 7 degrees when the car is taking a curve, which means that the ordinary pulley may shift to the right or left about 8 inches either side of the normal straight line position. In addition, the car body may tip relative to the track, and may have an up and down motion due to spring action and a fore and aft motion relative to the axle due to wear or play of the journal boxes. It is therefore natural that the belts frequently jump the pulleys, and are subject to excessive wear due to running out of line.

To overcome this difficulty, I mount both the driving and driven elements of the transmission on the underside of the car body in definitely fixed alignment,—making the driving element in the form of a ring pulley or gear having a large hole through which the axle passes with plenty of clearance on all sides,—and connect this driving element or ring to the axle by means of flexible or extensible members which allow a free axial play over a wide range, as well as free angular displacements and lateral movements.

I am aware that attempts have been made to drive railway generators by means of universal jointed pulleys mounted on the axle and guided from the car, but these have not had the proper longitudinal or axial movement to make them satisfactory, and involved undesirable universal surfaces requiring lubrication. As distinguished from these, in the present invention the pulley is not carried on the axle, but is mounted wholly on the car.

None of the prior constructions have had an externally mounted pulley combined with a driving connection of sufficient axial freedom or flexibility so as to allow the extended axial movement necessary to an operative device in railway service, where a total axial shift of 16 inches may occur.

Other objects of this invention are to dispense with universal joints and similar connections not suited to severe railway conditions; to make a transmission system that is easy to service; to save belt wear and tear; to permit larger drive pulleys and greater generator speeds and output; and various other objects as will become apparent as the description proceeds. Referring now to the drawings:

Fig. 1 is a general view in side elevation, partly in section, showing the transmission as applied to drive an electric generator from the axle of a railway car.

Fig. 2 is a vertical elevation of the driving pulley on a larger scale.

Fig. 3 is a vertical cross-section of the pulley wheel shown in Fig. 2, showing the flexible driving spring.

Fig. 4 is a horizontal cross-section of the pulley wheel shown in Fig. 2.

Figure 5:
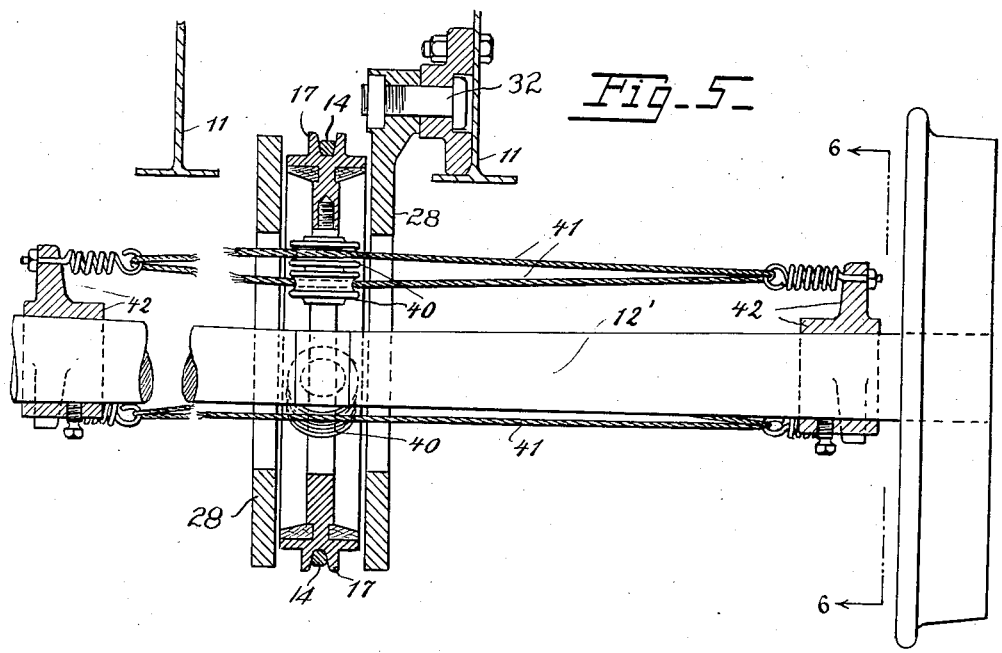
Fig. 5 illustrates a modified form of driving connection between the ring pulley and the axle, in which transverse cables or cords are used in place of a spring.
Figure 6:
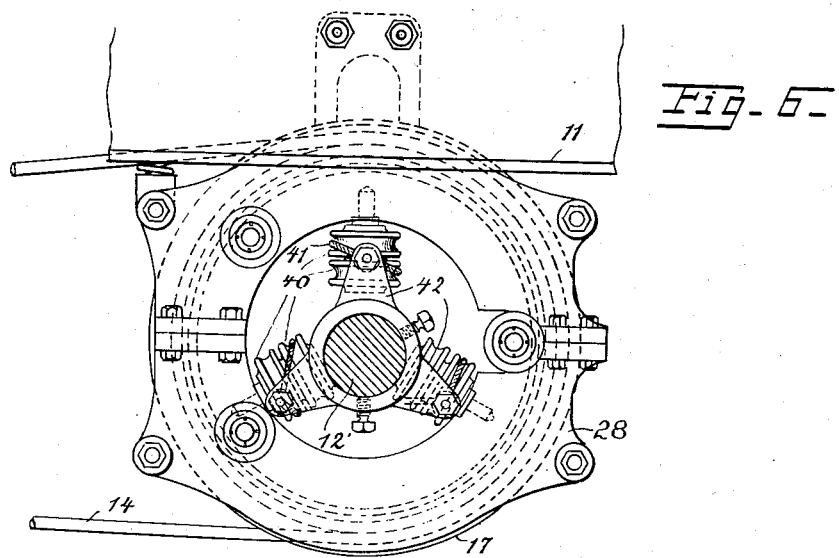
Fig. 6 is a side elevation of the modified form of drive wheel shown in Fig. 5.

Referring now to Fig. 1, the railroad car body 10 carried on the longitudinal beams 11 is mounted on the usual three axle trucks 12, of which one is shown, which truck 12 turns relatively to the car body 10 about the point 13 when rounding a curve. The foregoing being the usual or ordinary construction and being illustrated merely in a general or diagrammatic way. The electric generator 15 for charging the batteries of the car, operating the lights, refrigeration, air-conditioning or other services, is mounted on the underside of the car and is usually driven by a belt from a pulley mounted on the third axle 12' of the truck. As the truck turns about the pivot 13 when rounding a curve, the third axle 12' being behind the pivot, moves to the right or left of the normal straight line position and tends to throw the belt out of alignment with the generator so that the belt wears excessively and tends to jump the ordinary driving pulley. Also, the size of an ordinary driving pulley mounted on the third axle 12' is limited by the fact that it must be below the longitudinal car beams 11 as it cannot extend up between them for the reason that it would strike them as it shifted to the right or left in rounding a curve of the track.

In the present invention the driver pulley 17 is made in an annular form such as a ring or other shape having a large central opening having an ample clearance around the axle 12' in all directions. As this pulley 17 does not touch the axle 12' at any point, in any running position, the pulley 17 may be secured to the car beams 11 so as to be in definite alignment with the driven generator pulley 16 at all times. Thus a belt drive 14 may be used between drive pulley 17 and generator pulley 16 and will operate under conditions favorable to long life, and also chain or various forms of gear drives may be used, if desired, as will be apparent to those skilled in the art, since the center distances and alignment can be controlled within suitable limits.

In order to transmit the power from the car wheel or axle 12' to the ring or drive pulley 17, while permitting the axle 12' free play axially or longitudinally in and out of the ring as the truck turns on the pivot 13 in rounding a curve, a driving connection 20 between the axle 12' and ring pulley 17 which will transmit driving torque but be very yielding to axial motion is required.

One preferred form of this driving connection 20 is shown in greater detail in Fig. 2, Fig. 3, and Fig. 4 which also show in greater detail the method of mounting the drive ring or pulley 17.

This driving connection 20 is in the form of a pair of helical springs 20, 20, of large enough pitch diameter to go around the axle 12' with plenty of clearance, the outer ends of the springs 20 being secured to collars 22 clamped on the axle 12', and the inner ends of the springs 20 being fastened to the ring pulley 17 at the point 23. The metal of the springs 20 is in general thicker radially than axially, so that they are resistant to torque, but flexible to axial compression or extension.

Inasmuch as the springs 20 can be rigidly clamped at each end, and the movements and displacements are taken up by flexure, the lubricated adjusting surfaces characteristic of the so-called universal pulley mountings are avoided, and the wear and service troubles incident to such lubricated surfaces are overcome. It will be noted that the driving springs 20 are of opposite pitch, so that axial movement makes one unwind and the other wind up in driving, while at the neutral control position the end thrust is balanced.

The driving ring or pulley 17 is preferably mounted on three roller bearing rollers 25, 25', and 25''. Two of these rollers 25 and 25' are mounted in fixed roller bearings in the supporting frame 28, and the third roller 25'' is pivotally mounted to the frame 28 at the point 29, and is yieldingly forced in running contact with the pulley 17 by the spring 30. This three roller mounting, with one of the rollers spring pressed against the race of the pulley 17, insures a free-running pulley with automatic take-up of any wear or rattle. The pulley 17 is usually split so that it can be assembled around the axle 12' without removing a wheel, and the spring 20 has sufficient flexibility so that it can be threaded on the axle 12'.

The frame 28 is made of two annular plates connected by the spacer bolts 31, and is hung from the beam 11 on the pivotal mounting 32, allowing it a certain amount of play to adjust the belt tension. The tension of the belt is maintained by the spring 33, one end of which bears against the movable frame 28 which carries the pulley 17, while the other end of the spring 33 bears against the socket plate 34 which is bolted to the car beam 11.

It will thus be seen that the driving pulley 17, while it surrounds the axle 12', is wholly supported from the car beams or car body, and so is definitely held in running alignment with the generator pulley 16, which is also secured to the car beams or body, while at the same time the utmost freedom is allowed for all possible movements of the axle, by reason of the play of the driving connection 20.

While I have shown a pair of helical or cone-shaped springs 20 as one preferred embodiment of the driving connection, any other connection resistant to torque but having a long axial range of play or travel, say sixteen inches or so, may be used. For example, an alternative form of flexible connection is shown in Fig. 5, in which a system of transverse cables is used to transmit the torque and permit the play.

Referring more in detail to Fig. 5, the ring or drive pulley 17 carries on its inner opening three pairs of transverse pulley wheels 40, around which run three pairs of transverse cables 41, the two cables of each pair running in opposite directions around the pulleys 40 so as to drive in either direction. The ends of the cables 41 are secured to arms 42 fastened to the axle 12', so that they rotate with the axle, and so drive the ring pulley 17.

The axial play or travel when the car is rounding a curve is taken up by the pulley wheels 40 rolling along the cables 41 to the right or left, as the car body or frame 28 moves relative to the axle 12'. The other minor movements of the axle relative to the pulley 17 are taken up by the flexibility of the cables 41. Thus the torque is transmitted to the ring pulley 17 mounted on the car, while the utmost flexibility is allowed for all other motions.

With the coming of electrical refrigeration and air conditioning for railway cars, one of the problems is to increase the output of the generators. Without increasing the size of the generator, this added output can only be obtained by increasing its speed. One of the added advantages of the above described method of mounting the drive pulley 17 in fixed relation to the car body is that it can be made larger by extending it up between the car beams 11, which ordinarily could not be done because of the side play of the pulley when carried on the car axle.

While in the foregoing I have described certain specific examples, it will be understood that they are merely for the purpose of illustration to make clear the principles of the invention, which is not limited to the particular forms shown, and is susceptible to various modifications and adaptations in different installations as will be apparent to those skilled in the art without departing from the scope of the invention as stated in the following claims:

1. In a power transmission, the combination of a rotating shaft having extended movement in a longitudinal or axial direction, lesser movements laterally, and angular movements, a drive wheel spaced from and surrounding said shaft and having an opening through which the shaft extends, said opening affording clearance in all directions for said movements of the shaft, a frame secured against said axial movements, bearings rotatably mounting said drive wheel in said frame, so that it is also restrained from said axial movements, and a torque transmitting means between the shaft and the drive wheel, the points of attachment of said torque transmitting means to the shaft lying longitudinally outside of the drive wheel, said torque transmitting means being adjustable longitudinally over an extended range, laterally over a lesser range, and angularly, whereby a continuous driving connection is maintained between the shaft and drive wheel for all running positions.

2. In an electric generator drive for railway cars, the combination of a driven pulley, a driving pulley in fixed alignment with said driven pulley, a drive between said pulleys, an axle extending through the driven pulley with clearance on all sides, and a flexible torque transmitting means between the axle and driving pulley.

3. In an electric generator drive for railway cars, the combination of an axle in a railway car truck, a car body mounted to turn about a vertical pivot relative to the car truck and the axle, a ring wheel mounted with the car body and surrounding said axle with clearance on all sides to allow said ring wheel to turn with the car body irrespective of the axle, and a torque transmitting means between the axle and ring wheel capable of extended adjustment in an axial direction, lesser adjustment in lateral directions, and angular adjustments, whereby a continuous driving connection is maintained between the axle and ring wheel for all running positions.

4. In an electric generator drive for railway cars, the combination of a car axle, a car body, a driven pulley and a driver pulley mounted with the car body so as to maintain alignment with each other as the car turns, said driver pulley having an opening through which the axle extends with clearance in all directions to allow the turning movement of the car, and a torque transmitting means between the axle and ring wheel capable of extended adjustment in an axial direction, lesser adjustment in lateral directions, and angular adjustments, whereby a continuous driving connection is maintained between the axle and ring wheel for all running positions.

5. In an electric generator drive for railway cars, the combination of a driven pulley, a driving pulley in fixed alignment with said driven pulley, a drive between said pulleys, an axle extending through the driven pulley with clearance on all sides, and flexible torque transmitting means extending along the axle on both sides of the driving pulley.

6. In an electric generator drive for railway cars, the combination of an axle, a ring pulley surrounding said axle with clearance on all sides of said axle, means for supporting said ring pulley free of the axle and flexible torque transmitting means yieldable principally in an axial direction connecting the axle and ring pulley, said flexible means extending on both sides of the ring pulley.

7. In a power transmission, the combination of a driven wheel, a drive wheel in alignment with said driven wheel, power transmitting means between said wheels, said drive wheel having a central opening and an inner raceway, roller bearings engaging said raceway and holding said drive wheel against axial movement while allowing rotation, a rotating shaft having axial play and also lateral and angular movement, said shaft extending thru the opening of the drive wheel with clearance on all sides, and adjustable torque transmitting means extending on both sides of the drive wheel and connecting it to the shaft.

8. In a power transmission, the combination of a driven wheel, a drive wheel in alignment with said driven wheel, power transmitting means between said wheels, said drive wheel having a central opening and an inner raceway, roller bearings engaging said raceway and holding said drive wheel against axial movement while allowing rotation, a rotating shaft having axial play and also lateral and angular movement, said shaft extending thru the opening of the drive wheel with clearance on all sides, and a coil spring connecting the drive wheel and shaft, the point of attachment of said coil spring to the shaft lying longitudinally outside of the drive wheel, said coil spring being wound around the shaft with coils considerably greater in diameter than the shaft, whereby torque is transmitted but play allowed the shaft within the spring and drive wheel.

9. In a power transmission, the combination of an axle, a drive wheel surrounding said axle with an internal opening thru which the axle extends with clearance on all sides of said axle, transverse pulleys mounted on said wheel within said opening and clear of the axle, and transverse cables extending thru said opening and on said pulleys and secured at the ends to rotate with the axle, whereby torque is transmitted from the axle to the drive wheel, while allowing free play to the axle.

10. In a power transmission, the combination of an axle, a drive wheel surrounding said axle with an internal opening through which the axle extends with clearance on all sides of said axle, transverse cables extending through said opening in operative contact with said drive wheel, said cables being secured to the axle to rotate therewith, whereby torque is transmitted from the axle to the drive wheel, while allowing free play to the axle.

11. In a power transmission, the combination of an axle, a drive wheel surrounding said axle with an internal opening through which the axle extends with clearance on all sides of said axle, driving arms secured to said axle on both sides of said drive wheel and spaced axially therefrom, and transverse cables extending from one set of driving arms through the drive wheel to the other set of driving arms, said cables being in operative contact with said drive wheel for rotation, while allowing free axial motion, whereby torque is transmitted from the axle to the drive wheel in various positions.

12. In a power transmission, the combination of an axle, a drive wheel surrounding said axle with an internal opening through which the axle extends with clearance on all sides of said axle, driving arms secured to said axle on both sides of said drive wheel and spaced axially therefrom, and transverse driving means extending from one set of driving arms through the drive wheel to the other set of driving arms, said transverse driving means being in operative contact with said drive wheel for rotation, while allowing free axial motion, whereby torque is transmitted from the axle to the drive wheel in various positions.

FRANK L. MORSE.